(12) United States Patent
Haj Bolouri (10) Patent No.: US 10,688,413 B2
(45) Date of Patent: Jun. 23, 2020

(54) GAS STRIPPER SYSTEM

(71) Applicant: General Electric Technology GmbH, Baden (CH)

(72) Inventor: Faegheh Haj Bolouri, Nussbaumen (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 205 days.

(21) Appl. No.: 15/176,494

(22) Filed: Jun. 8, 2016

(65) Prior Publication Data
US 2016/0367914 A1 Dec. 22, 2016

(30) Foreign Application Priority Data
Jun. 18, 2015 (EP) ..................................... 15172745

(51) Int. Cl.
*B01D 19/00* (2006.01)
*G21F 9/08* (2006.01)
*B01D 3/00* (2006.01)

(52) U.S. Cl.
CPC ..... *B01D 19/0005* (2013.01); *B01D 19/0015* (2013.01); *B01D 19/0042* (2013.01); *G21F 9/08* (2013.01); *B01D 3/008* (2013.01)

(58) Field of Classification Search
CPC ............... B01D 3/008; B01D 19/0005; B01D 19/0015; B01D 19/0042; G21F 9/08
See application file for complete search history.

(56) References Cited

U.S. PATENT DOCUMENTS 2,428,768 A * 10/1947 Bertram ................... B01D 1/04
                                                          122/459
2,610,832 A *  9/1952 Holmes .................... F28B 1/00
                                                          165/160
(Continued)

FOREIGN PATENT DOCUMENTS

CN        202844647 U      4/2013
WO        2014/072792 A2   5/2014

OTHER PUBLICATIONS

Search report for EP Patent Application No. 15172745.0 dated Nov. 27, 2015.
(Continued)

*Primary Examiner* — Jonathan Miller
*Assistant Examiner* — Gabriel E Gitman
(74) *Attorney, Agent, or Firm* — Grogan, Tuccillo & Vanderleeden, LLP (57) ABSTRACT

A gas stripper system for purification of a primary coolant contaminated in cooling a nuclear reactor is provided. The gas stripper system includes a gas stripper column and a condenser arrangement. The column is adapted to receive the liquid phased contaminated primary coolant. The column defines top, bottom and middle sections and includes a distributor member, a re-boiler member and a separation member disposed therealong. The distributor member, a re-boiler member and a separation member with structured packing are configured such that maximum contact between the liquid phased primary coolant and gaseous phased primary coolant is made. Moreover, the condenser arrangement is configured to the gas stripper column to receive and condense the vapour phased primary coolant.

6 Claims, 6 Drawing Sheets

(56) References Cited

U.S. PATENT DOCUMENTS

| | | | | |
|---|---|---|---|---|
| 2,792,904 | A | | 5/1957 | Sebald |
| 3,480,515 | A | * | 11/1969 | Goeldner ................. B01D 1/04 159/13.3 |
| 3,749,647 | A | * | 7/1973 | Mickelwright .......... B01D 3/14 202/153 |
| 3,839,159 | A | * | 10/1974 | Dunnavant ............... G21C 7/22 376/308 |
| 3,969,194 | A | * | 7/1976 | Mende ..................... B01D 3/14 203/40 |
| 4,043,865 | A | * | 8/1977 | Kausz ...................... G21C 7/22 376/310 |
| 4,470,949 | A | * | 9/1984 | Deroubaix ............... G21C 7/00 376/217 |
| 4,808,350 | A | * | 2/1989 | Robbins ................... B01D 3/20 261/96 |
| 4,909,967 | A | | 3/1990 | Binkley et al. |
| 5,005,637 | A | * | 4/1991 | Gentry .................. F22B 37/206 122/510 |
| 5,061,407 | A | * | 10/1991 | Nutter ................... B01D 53/185 261/96 |
| 5,547,617 | A | * | 8/1996 | Lee .......................... B01D 3/20 261/114.1 |
| 5,980,694 | A | * | 11/1999 | Apeldoorn ............... B01D 3/42 202/152 |
| 6,206,349 | B1 | * | 3/2001 | Parten ..................... B01J 19/32 261/112.2 |
| 6,883,788 | B1 | * | 4/2005 | Tagamolila .............. B01D 3/16 165/DIG. 197 |
| 2005/0189663 | A1 | * | 9/2005 | Dollie .................... B01D 3/008 261/97 |
| 2006/0009870 | A1 | * | 1/2006 | Lee ........................ B01D 3/008 700/97 |
| 2009/0290676 | A1 | * | 11/2009 | Meintker ........... B01D 19/0005 376/367 |
| 2012/0009114 | A1 | | 1/2012 | Chen et al. |
| 2012/0063975 | A1 | * | 3/2012 | Koss .................. B01D 53/1425 423/220 |
| 2013/0056677 | A1 | | 3/2013 | Bela |

OTHER PUBLICATIONS

Office Action issued in connection with corresponding EP Application No. 15172745.0 dated Apr. 10, 2018.

* cited by examiner

GAS STRIPPER SYSTEM

CROSS-REFERENCE TO RELATED APPLICATIONS

This application claims priority to European Patent Application No. 15172745.0 filed Jun. 18, 2015, the contents of which are hereby incorporated in its entirety.

TECHNICAL FIELD

The present disclosure relates generally to degasification devices, more particularly, to a gas stripper system.

BACKGROUND

Gas strippers are generally used in a physical separation process where one or more components are removed from a liquid stream by a vapour stream, the streams flowing in counter current directions. For example in nuclear plants, such gas strippers may be generally utilized for purification of primary coolants that are circulated along the nuclear reactors for cooling. Generally, the primary coolants are circulated along the nuclear reactors to continuously cool the reactors. As the coolant is circulated during the cooling process, the coolant becomes contaminated by dissolved radioactive gases, among other things. Therefore, it is necessary to continuously purify and clean the coolant to remove the contaminants and to avoid discharge of hazardous elements to the environment. In general, a very high degasification factor (e.g., $10^6$) is needed in order to remove radioactive gases, such as, for example, Xenon and Krypton. The known coolant cleaning processes usually involve two main treatment steps. First, to concentrate the coolant, and then secondly, to remove the radioactive gases by stripping. In the stripping process, a cleaning agent, such as boric acid, may be sprayed into the upper part of the stripping column and, as it flows down the column, it flows through sieve trays in order to increase the contact time between the liquid and gas streams. In the case of sieve trays, the contact area may not be well defined and changes with the flow regime and the steam velocity.

Various conventional gas strippers have been developed and utilized for this purpose. In designing the gas strippers, one of the most important and determining criteria is designing it in order to have sufficient contact between the liquid and vapour streams. There remains an industrial challenge to achieve a balance between the energy and costs needed in order to gain maximum contact between the liquid and vapour phases.

Accordingly, there exists a need for a gas stripper with improved design so that efficiency of the overall system may be improved.

SUMMARY

The present disclosure discloses an improved gas stripper system that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

A general object of the present disclosure is to provide a gas stripper system with an improved design, which may be utilized, but not limited to, in power plants, such as nuclear power plants, for example.

In one aspect of the present disclosure, a gas stripper system for purification of a primary coolant contaminated in cooling a nuclear reactor is provided. The gas stripper system may include a gas stripper column and a condenser arrangement. The gas stripper column may be adapted to receive the liquid phased contaminated primary coolant. The gas stripper column defines top, bottom and middle sections and includes a distributor member, a re-boiler member and a separation member disposed therealong. In an embodiment, the distributor member is configured along the top of the gas stripper column and adapted to evenly distribute the liquid phased contaminated primary coolant while flowing from the top to bottom of the column. Further, the re-boiler member is configured along the bottom of the gas stripper column and adapted to heat the primary coolant to a gaseous phase. The gaseous phased coolant is raised counter current to the liquid phased contaminated primary coolant from the bottom to the top of the column. The separation member is disposed along the middle section of the column, between the distributor and re-boiler members. The separation member includes a structured packing so as to enable maximum contact of the liquid phased primary coolant with the gaseous phased primary coolant rising counter current to liquid phased contaminated primary coolant to be dissolved to obtain vapour phased thereof. The condenser arrangement is configured to the gas stripper column to receive and condense the vapour phased primary coolant so as to enable non-condensable gases to be discharged and return of the condensate to the gas stripper column.

In an embodiment, the separation member may include structured packing. Further, in one embodiment, the distribution member is configured to include various conduits having outlets. The conduit outlets are arranged to evenly distribute the primary coolant along the structured packing. Furthermore, the re-boiler may be configured as a stacked tube structure located within the column. The re-boiler may also be configured as an electrical re-boiler located external of the column to vaporize the coolant. Similarly, the condenser may be located internally or externally to the column.

The distributor member, a re-boiler member and a separation member are configured so as to balance the liquid phased primary coolant and conversion of the gaseous phased primary coolant such that the maximum contact therebetween may be made along the separation member. Further, the condenser arrangement enables efficient separation of non-condensable gases including the radioactive gases xenon and krypton from the coolant making the overall system efficient.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will better understood with reference to the following detailed

Like reference numerals refer to like parts throughout the description of several views of the drawings.

DETAILED DESCRIPTION

For a thorough understanding of the present disclosure, reference is to be made to the following detailed description, including the appended claims, in connection with the above-described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms used herein do not denote any order, elevation or importance, but rather are used to distinguish one element from another. Further, the terms "a," "an," and "plurality" herein do not denote a limitation of quantity, but rather denote the presence of at least one of the referenced item.

Figure 1:
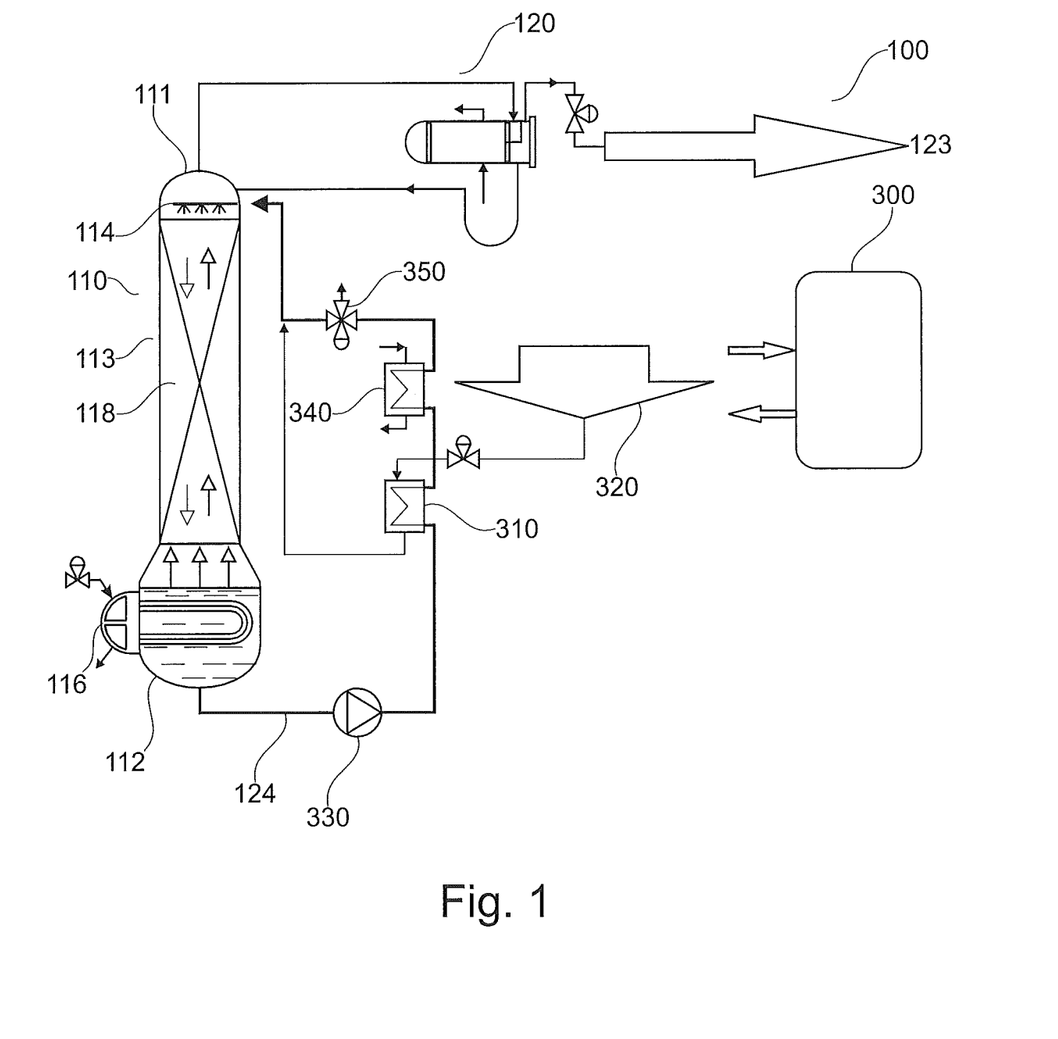
FIG. 1 depicts a gas stripper system, in accordance with an exemplary embodiment of the present disclosure.

Referring to FIG. 1, a gas stripper system 100 is shown in accordance with an exemplary embodiment of the present disclosure. The gas stripper system 100 will be described herein in conjunction to FIGS. 1-6. In as much as the construction and arrangement of the system 100, various associated elements may be well-known to those skilled in the art, it is not deemed necessary for purposes of acquiring an understanding of the present disclosure that there be recited herein all of the constructional details and explanation thereof. Rather, it is deemed sufficient to simply note that as shown in FIGS. 1-6, in the system 100, only those components are shown that are relevant for the description of one or various embodiments of the present disclosure.

As shown in FIG. 1, the system 100 may be utilized for purifying and cleaning a liquid coolant which has been contaminated from use in cooling a nuclear reactor 300. The gas stripper system 100 includes a gas stripper column 110 and a condenser 120. The gas stripper column 110 is configured to receive the contaminated coolant. The gas stripper column 110 includes a top section 111, a bottom section 112 and a middle section 113. The gas stripper column 110 includes a liquid distributor 114, a re-boiler 116 and one or more separation elements 118 disposed within the gas stripper column 110.

Figure 2:
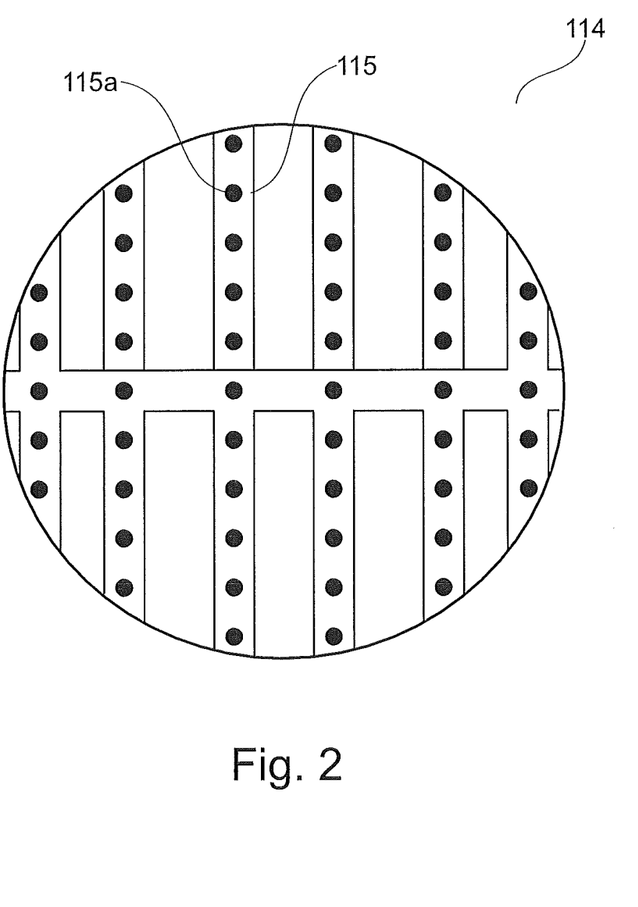
FIG. 2 illustrates a top view a distributor member, in accordance with an exemplary embodiment of the present disclosure.

In an example embodiment, the distributor 114 is located within the top section 111 of the gas stripper column 110 and is configured to evenly distribute the contaminated coolant across the gas stripper column 110 as the liquid contaminated coolant flows from the top section 111 to bottom section 112 of the column 110. As shown in FIG. 2, an example of the distributor 114 is shown. Such distributor 114 may include a plurality of conduits 115 arranged in parallel and crosswise manner. Each conduit 115 may include outlets 115a configured therealong to evenly discharge the contaminated coolant on to the separation member 118. The distributor 114, as shown in FIG. 2, is one embodiment of various other arrangements that the distributor 114 may take in order to evenly distribute the contaminated coolant.

Figure 3A:
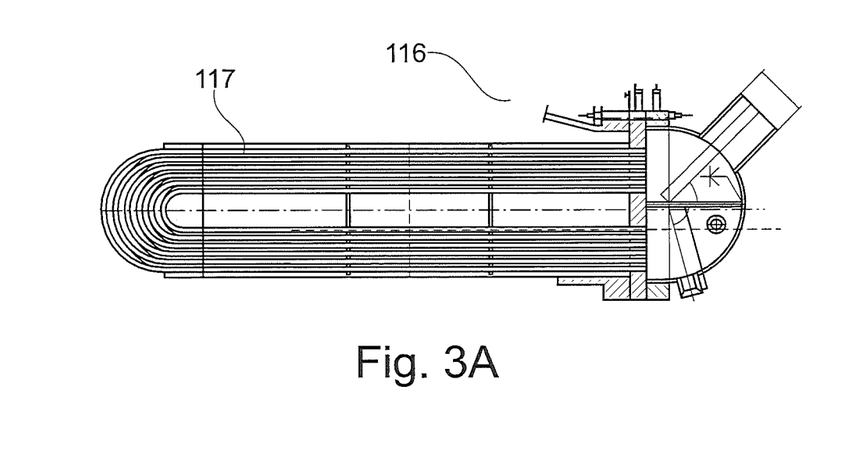
FIGS. 3A-3D illustrate various views of a re-boiler, in accordance with various exemplary embodiments of the present disclosure.
Figure 3B:
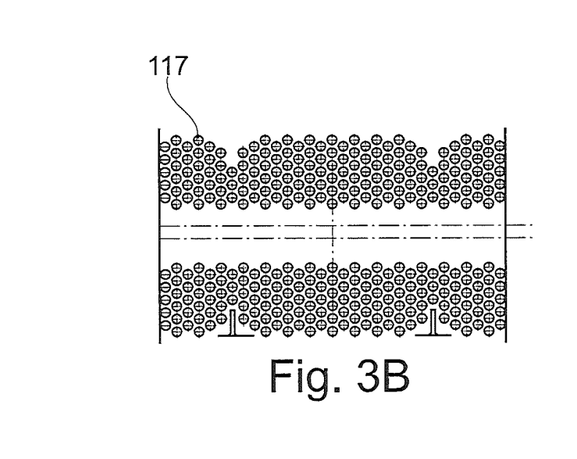
Figure 3C:
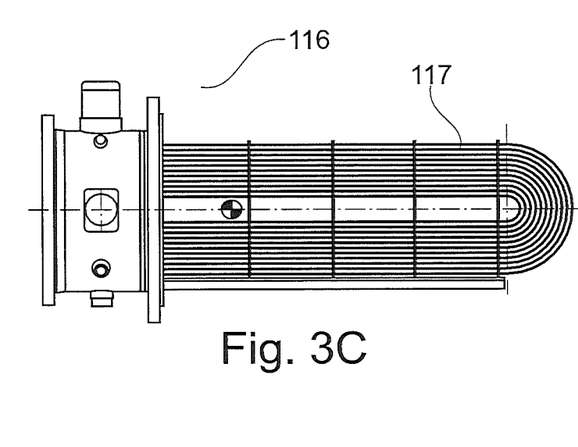
Figure 3D:
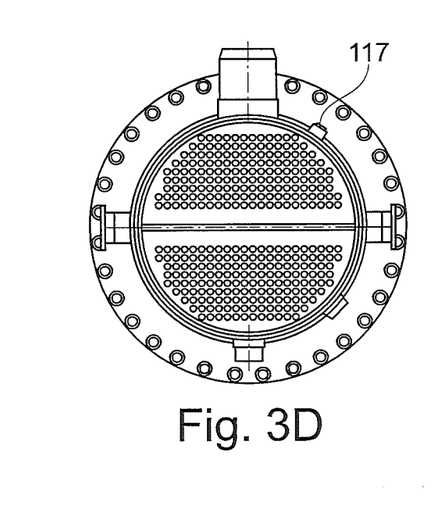

Further, the re-boiler 116 is preferably located at the bottom 112 of the column 110 (either externally or internally) and is configured to heat the primary coolant to a gaseous phase. The liquid phased coolant is heated and vaporized, thus flowing upwards through the column, i.e., from the bottom 112 to the top 111 of the column 110 and counter current to the liquid contaminated coolant flowing downwards. In one embodiment, as shown in FIGS. 3A-3D, the re-boiler 116 may include a plurality of tubes 117 stacked in a rectangular bundle, as shown in FIGS. 3A and 3B, or in a circular bundle, as shown in FIGS. 3C and 3D, so as to circulate heated fluid or steam in order to heat the primary coolant at the bottom of the column 110, and thus, to convert thereto into the gaseous phase. In one form, the tubes 117 may be U-shaped. However, without departing from the scope of the present disclosure, the tubes 117 may comprise any other shape and design as per the industrial requirement.

Figure 6:
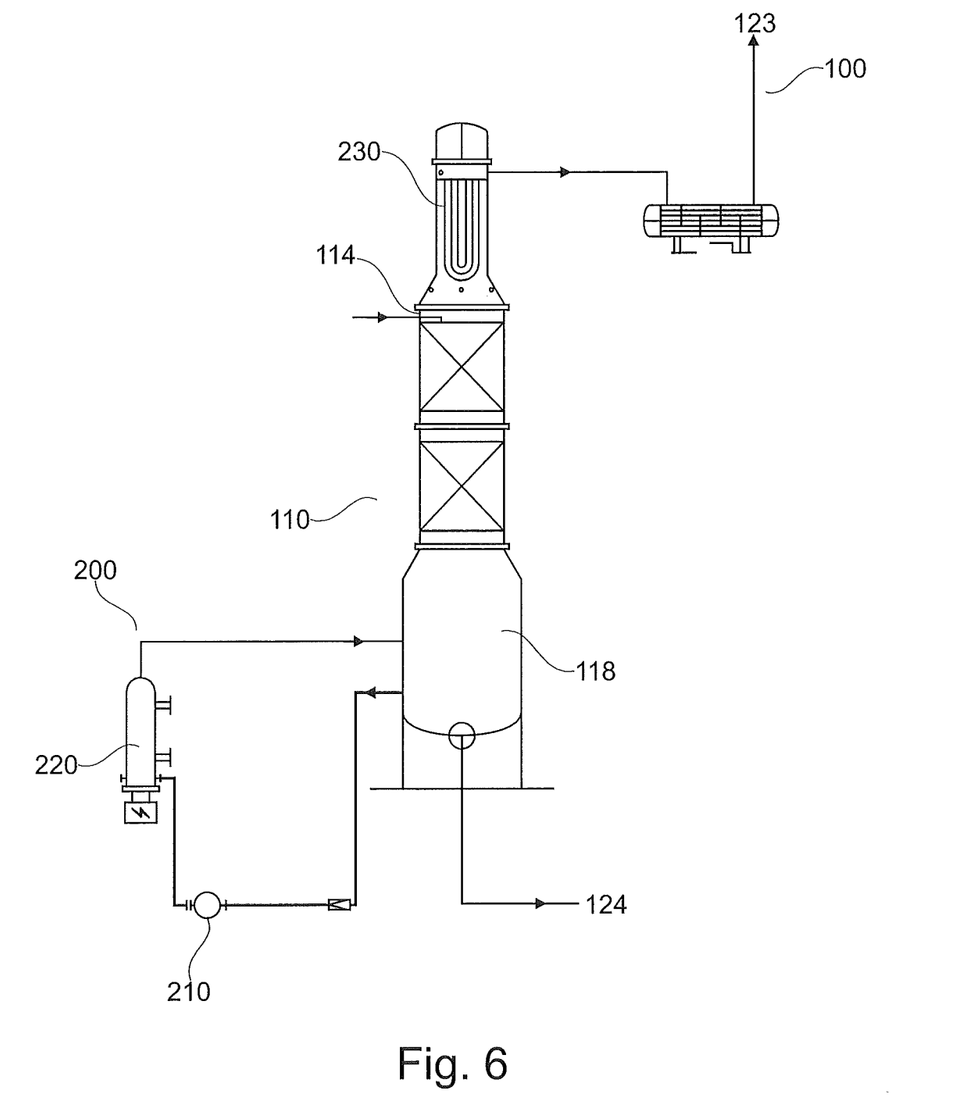
FIG. 6 depicts a gas stripper system, in accordance with another exemplary embodiment of the present disclosure.

In another embodiment, as shown in FIG. 6, the re-boiler 116 may be an electrical re-boiler 200 placed outside of the column 110 to vaporize the coolant, and is described below.

Figure 4A:
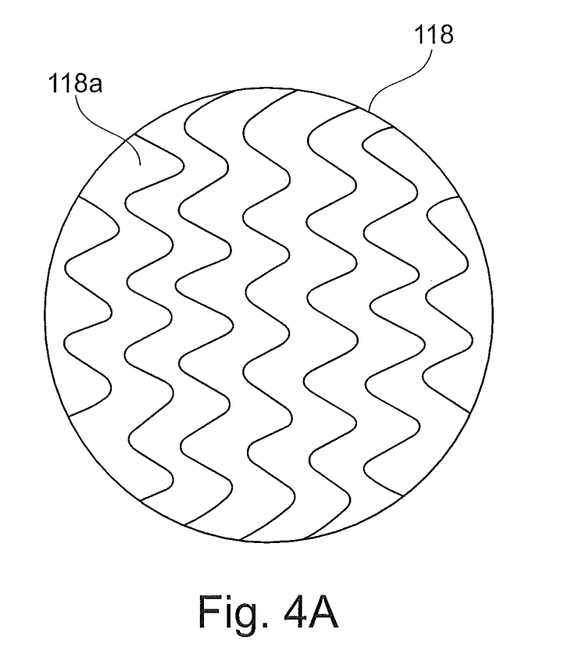
FIGS. 4A and 4B illustrate a cross-sectional view of the separation section including a plurality of separation elements stacked together; and a single separation element, in accordance with an exemplary embodiment of the present disclosure.
Figure 4B:
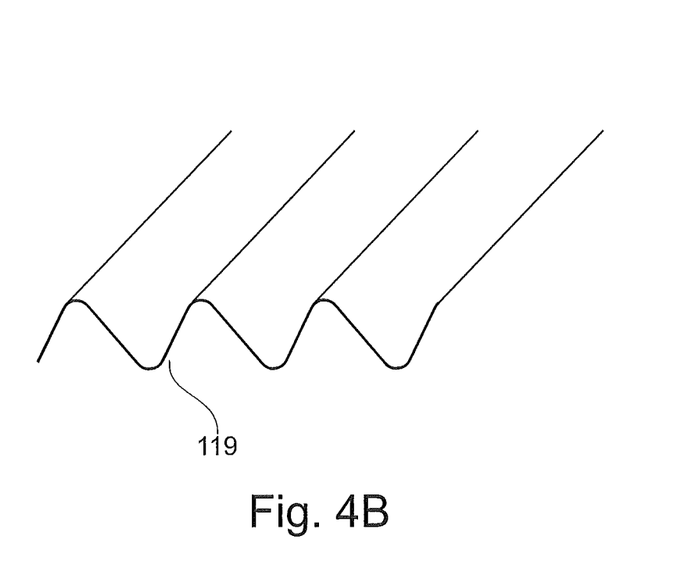

Furthermore, as shown in FIGS. 4A and 4B, the separation element 118 is located within the middle section 113 of the column 110, i.e., between the distributor 114 and re-boiler 116. The separation element 118 may include a structured packing 118a so as to enable maximum contact of the contaminated coolant with the gaseous phased coolant as it is rising through the columns 110. In one embodiment of the present disclosure, as shown in FIGS. 4A and 4B, the separation element 118 with the structured packing 118a may be configured using corrugated metallic sheets 119, as shown in FIG. 4B. Various such sheets 119 may be stacked one above the other to obtain the structure element 118, as shown in the top cross-sectional view of the separation element 118, in FIG. 4A. The separation element 118 as shown in FIGS. 4A-4B are example depictions and may not be considered to be limited to only such an arrangement, in fact, there may be various other arrangements of the separation element 118 that may be capable of enabling maximum contact of the contaminated coolant with the gaseous phased primary. The separation element 118 with such structured packing 118a enables the liquid phased primary coolant to be distributed along its entire area more evenly, which forms a thin layer of the liquid phased primary coolant thereby making maximum contact thereof with the gaseous primary coolant and reducing the mass transfer resistance on the liquid side to enhance the degasification efficiency.

Figure 5A:
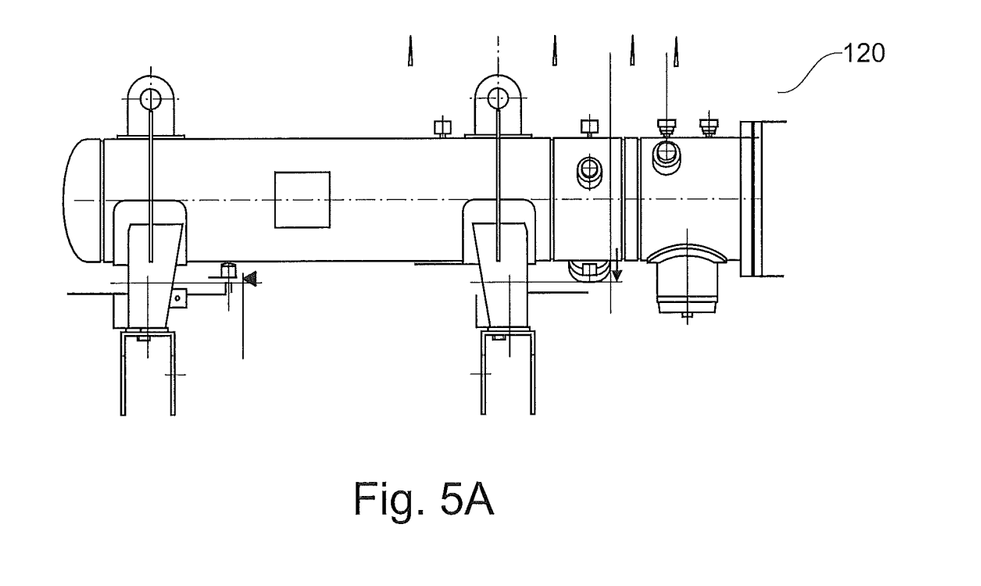
FIGS. 5A and 5B, respectively, depict a condenser and a cross-section thereof, in accordance with an exemplary embodiment of the present disclosure.
Figure 5B:
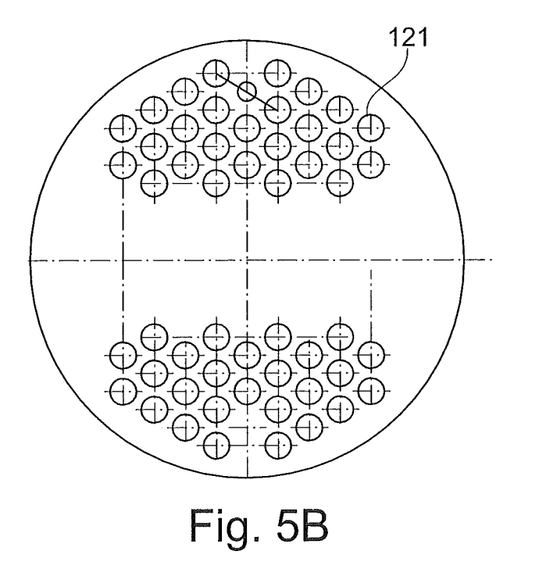

Further, in the system 100 the condenser arrangement 120, as shown in example FIGS. 5A and 5B, is in communication with column 110 and is configured to receive and condense the vapour phased primary coolant so as to enable non-condensable gases to be discharged and return of the condensate of the primary coolant to the column 110. The condenser arrangement 120 includes tubes 121 (as shown in FIG. 5B, a cross-sectional view of the condenser arrangement 120 of FIG. 5A) that enables steam/gas mixture of the primary coolant to be entered therein. In the tubes 121, the mixture is condensed and non-condensable/radioactive gases are vented to a gas treatment system 123. Outside of the tube 121, the cooling water removes the condensation heat.

In operation of the system 100, referenced from example FIG. 1, the primary coolant after cooling the nuclear reactor 300, the contaminated primary coolant with dissolved gases, such as xenon, krypton etc. is allowed to be directed from a tank 320 to the column 110 via passing through a recovery heat exchanger 310 and gaining heat therefrom. The contaminated primary coolant in liquid phase enters the distributor 114 at the top 111 of the column 110 and is distributed on the separation member 118 and flows to the bottom 112 of the column 110. The part of the primary coolant is heated and evaporated by the re-boiler 116. The evaporated or gaseous phased coolant raise from the bottom 112 to the top 111 of the column 110 and flows counter current to the liquid phased contaminated primary coolant. The separation element 118 with the structured packing 118a enables maximum contact of the liquid phased primary coolant with the gaseous phased primary coolant to be dissolved to obtain a stream of vapour phased primary coolant. The vaporised coolant enters the condenser arrangement 120 where it is condensed to enable non-condensable gases to be discharged and return of the condensate of the primary coolant to the column 110. Furthermore, the primary coolant, free from the impurities, is adapted to be make exit from a return line 124 at the bottom 112 of the column 110 and via a pump 330 it is circulated to pass through the exchanger 310 and the cooler 340 to lose its heat and then exit via a three-way valve 350 to be stored. The primary coolant used may be boric acid.

In operation of another system 100, referenced from example FIG. 6, apart from the electrical re-boiler 200 and an internal condenser 230, other components are more or less similar as described above in FIG. 1. In the arrangement of FIG. 6, the electrical re-boiler 200 is placed outside of the column 110; however, the function of the electrical re-boiler 200 is similar to that of the re-boiler member 116. In electrical re-boiler arrangement 200, a recirculation pump 210 and the electrical heater 220, respectively, used to circulate and heat the primary coolant in the column 110 laying along the bottom section 112. Further, in such system 100, the condenser 230 may be configured integral to the column 110 along the top section 111; however, the function of the condenser 230 is similar to that of the condenser 120. Other operations are same as described above.

The system 100 of the present disclosure is advantageous in various scopes such as described above. The combination of the distributor member, a re-boiler member and the separation member along with the condenser member are configured such that the overall arrangement balances the distribution of the liquid phased primary coolant and conversion of the gaseous phased primary coolant such that the maximum contact therebetween may be made along the separation member. Specifically, the structured packing of the separation member enables maximum surface contact between the gas and the liquid with lowest possible mass transfer resistance because of thin liquid film is obtained along the separation member that ensures the required degasification factor will be achieved by this equipment. Moreover, the system is economical and comparatively easy to manufacture.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A gas stripper system for purification of a primary coolant contaminated in cooling a nuclear reactor, the gas stripper system comprising:
   a column configured to receive a liquid phased contaminated primary coolant, the column comprising:
   at least a top section;
   a bottom section;
   a middle section;
   a distributor member disposed in the top section of the column and configured to evenly distribute the liquid phased contaminated primary coolant as it flows from the top section to the bottom section of the column;
   a re-boiler disposed in the bottom section of the column configured to heat the liquid phased contaminated primary coolant to a gaseous phase;
   a separation element disposed in the middle section of the column, the separation element comprising structured packing;
   a condenser configured to receive the gaseous phased contaminated primary coolant, condense the gaseous phased contaminated primary coolant, provide for non-condensable gases to be discharged, and return a condensate to the column; and a return line provided between the bottom section of the column and the distributor member, and a pump, a heat exchanger, a cooler and a three-way valve along the return line;

wherein the three-way valve is configured to allow impurity-free primary coolant to exit the return line.

2. The gas stripper system as claimed in claim 1, wherein the distributor member comprises a plurality of conduits arranged in parallel and crosswise manner, each of the conduits comprising an outlet configured to discharge the liquid phased contaminated primary coolant onto the separation element.

3. The gas stripper system as claimed in claim 1, wherein the re-boiler comprises a plurality of tubes stacked in a circular or rectangular bundle so as to circulate heated fluid to heat the liquid phased contaminated primary coolant at the bottom of the column to convert the liquid phased contaminated primary coolant to the gaseous phase.

4. The gas stripper system as claimed in claim 3, wherein each of the tubes is U-shaped.

5. The gas stripper system as claimed in claim 1, wherein the condenser comprises a plurality of tubes that enables a steam/gas mixture of the gaseous phased contaminated primary coolant to be entered therein, wherein in the tubes, a portion of the steam/gas mixture is condensed and non-condensable/radioactive gases are vented.

6. A column for a gas stripper system for purification of a primary coolant contaminated in cooling a nuclear reactor, the column comprising:
   a top section;
   a bottom section;
   a middle section;
   a distributor member disposed in the top section and configured to evenly distribute the liquid phased contaminated primary coolant as it flows from the top section to the bottom section;
   a re-boiler disposed in the bottom section and configured to heat the liquid phased contaminated primary coolant to a gaseous phase; and
   a separation element disposed in the middle section and comprising corrugated metallic sheets and structured packing; and
   a return line provided between the bottom section of the column and the distributor member, and a pump, a heat exchanger, a cooler and a three-way valve along the return line;
   wherein the three-way valve is configured to allow impurity-free primary coolant to exit the return line.

* * * * *